US012403862B1

(12) United States Patent
Ashdown et al.

(10) Patent No.: US 12,403,862 B1
(45) Date of Patent: Sep. 2, 2025

(54) CENTRAL AUTHORITY FOR CERTIFYING UNBONDED ACCESS TO A VEHICLE VIA A DIGITAL KEY DEVICE

(71) Applicant: Google LLC, Mountain View, CA (US)

(72) Inventors: Emelie Jess Ashdown, San Diego, CA (US); Nicholas Ryan Miller, New York, NY (US)

(73) Assignee: Google LLC, Mountain View, CA (US)

( * ) Notice: Subject to any disclaimer, the term of this patent is extended or adjusted under 35 U.S.C. 154(b) by 13 days.

(21) Appl. No.: 18/640,527

(22) Filed: Apr. 19, 2024

(51) Int. Cl.
B60R 25/24 (2013.01)
B60R 25/01 (2013.01)

(52) U.S. Cl.
CPC ............ B60R 25/241 (2013.01); B60R 25/01 (2013.01)

(58) Field of Classification Search
CPC .............................. B60R 25/241; B60R 25/01
See application file for complete search history.

(56) References Cited

U.S. PATENT DOCUMENTS

| 10,310,505 | B1 * | 6/2019 | Hanson | G05D 1/0088 |
| 2014/0188348 | A1 | 7/2014 | Gautama et al. | |
| 2016/0063786 | A1 * | 3/2016 | Lewis | B60R 25/24 340/5.72 |
| 2016/0203661 | A1 * | 7/2016 | Pudar | G07C 9/00571 340/5.25 |
| 2017/0178035 | A1 | 6/2017 | Grimm et al. | |
| 2017/0195322 | A1 * | 7/2017 | Cho | G07C 9/27 |
| 2018/0194324 | A1 * | 7/2018 | Neugebauer | H04L 63/0807 |
| 2021/0061224 | A1 | 3/2021 | Kim et al. | |
| 2021/0078536 | A1 | 3/2021 | Stitt | |
| 2021/0250355 | A1 * | 8/2021 | Galdo | G06F 21/335 |
| 2022/0111820 | A1 | 4/2022 | Hassani et al. | |
| 2023/0101560 | A1 | 3/2023 | Ghamsari et al. | |
| 2023/0162544 | A1 | 5/2023 | Hua et al. | |
| 2023/0316831 | A1 * | 10/2023 | Einberg | G06F 21/31 340/5.61 |
| 2024/0208462 | A1 * | 6/2024 | Bandi | B60R 25/305 |

FOREIGN PATENT DOCUMENTS

| WO | 2023093222 A1 | 6/2023 | |
| WO | WO-2025004126 A1 * | 1/2025 | B60R 25/24 |

OTHER PUBLICATIONS

International Search Report and Written Opinion of International Application No. PCT/US2025/019393 dated Jun. 11, 2025, 10 pp.

* cited by examiner

Primary Examiner — Nabil H Syed
(74) Attorney, Agent, or Firm — Shumaker & Sieffert, P.A.

(57) ABSTRACT

Techniques for certifying unbonded access to a vehicle are disclosed herein. An example method includes receiving, by a vehicle and from a computing system, a service identifier associated with a function of the vehicle, wherein the vehicle stores one or more device identifiers for each digital key device in communication with the vehicle, receiving, from a digital key device, a signed token associated with the service identifier, wherein the one or more device identifiers do not include a device identifier for the digital key device, sending, to the computing system, the signed token, receiving, from the computing system, an indication of whether the signed token is verified, responsive to determining, based on the indication, that the signed token is verified, authorizing use of the function of the vehicle, and storing the device identifier for the digital key device.

20 Claims, 4 Drawing Sheets

CENTRAL AUTHORITY FOR CERTIFYING UNBONDED ACCESS TO A VEHICLE VIA A DIGITAL KEY DEVICE

BACKGROUND

A vehicle may have one or more digital keys that may be used to, for example, unlock and operate the vehicle. A digital key may be linked with the vehicle's owner, such as through ownership records of a vehicle manufacturer assigning the digital key to an account or other record of the vehicle's owner, to prevent unauthorized access to or use of the vehicle. When multiple digital keys are issued for the vehicle, each digital key may be similarly associated with the vehicle's owner for these reasons.

SUMMARY

In general, aspects of the techniques of this disclosure are directed to a central authority for certifying unbonded access to a vehicle via a digital key device. For example, autonomous vehicles, such as autonomous taxis, or taxi of ride share services may verify users (e.g., passengers), such that the user entering a vehicle may be confirmed as the correct user (e.g., the user that requested transport via the vehicle).

Some solutions may allow digital keys to be shared with multiple users when the users complete a registration process that links these users with the owner of the vehicle. For example, individual digital keys along with an account of the user to which the digital key was issued may be stored, such as in an ownership record or database of the vehicle's manufacturer. To obtain such an account, the user may be required to complete a registration process, including one or more verification and/or authorization steps. In some examples, the vehicle's owner, the user, or both must verify their identities and authorize issuance of the digital key to the user before the user can be linked to the vehicle owner.

In accordance with the techniques disclosed herein, rather than requiring users to be linked (e.g., bonded) with a vehicle owner, the central authority may certify both users and vehicles at their time of interaction, such as at the start of their itinerary (e.g., trip, journey, route), during their itinerary, or both. As such, the central authority certifies unbonded access to a vehicle allowing the user to enter, operate vehicle functions, or both. As will be described further below, the unbonded access may verify both users and vehicles, which may provide safety and convenience in use cases, such as autonomous vehicles or ride sharing services, where one vehicle may have any number of unrelated users or where a vehicle owner wishes to share their vehicle.

In some aspects, the techniques described herein relate to a method including receiving, by a vehicle and from a computing system, a service identifier associated with a function of the vehicle, wherein the vehicle stores one or more device identifiers for each digital key device in communication with the vehicle; after advertising, by the vehicle, the service identifier, receiving, by the vehicle and from a digital key device, a signed token associated with the service identifier, wherein the one or more device identifiers do not include a device identifier for the digital key device; sending, by the vehicle and to the computing system, the signed token; receiving, by the vehicle and from the computing system, an indication of whether the signed token is verified; responsive to determining, by the vehicle and based on the indication, that the signed token is verified, authorizing, by the vehicle, use of the function of the vehicle; and storing, by the vehicle, the device identifier for the digital key device.

In some aspects, the techniques described herein relate to a computing device including a memory that stores instructions; and one or more processors that execute the instructions to: receive, from a computing system, a service identifier associated with a function of the vehicle, wherein the vehicle stores one or more device identifiers for each digital key device in communication with the vehicle; after advertising the service identifier, receive, from a digital key device, a signed token associated with the service identifier, wherein the one or more device identifiers do not include a device identifier for the digital key device; send, to the computing system, the signed token; receive, from the computing system, an indication of whether the signed token is verified; responsive to determining, based on the indication, that the signed token is verified, authorize use of the function of the vehicle; and store the device identifier for the digital key device.

In some aspects, the techniques described herein relate to a non-transitory computer-readable storage medium including instructions, that when executed by one or more processors of a computing device, cause the one or more processors to: receive, from a computing system, a service identifier associated with a function of the vehicle, wherein the vehicle stores one or more device identifiers for each digital key device in communication with the vehicle; after advertising the service identifier, receive, from a digital key device, a signed token associated with the service identifier, wherein the one or more device identifiers do not include a device identifier for the digital key device; send, to the computing system, the signed token; receive, from the computing system, an indication of whether the signed token is verified; responsive to determining, based on the indication, that the signed token is verified, authorize use of the function of the vehicle; and store the device identifier for the digital key device.

The details of one or more examples of the subject matter of this specification are set forth in the accompanying drawings and the description below. Other features, aspects, and advantages of the subject matter will become apparent from the description, the drawings, and the claims.

DETAILED DESCRIPTION

Figure 1:
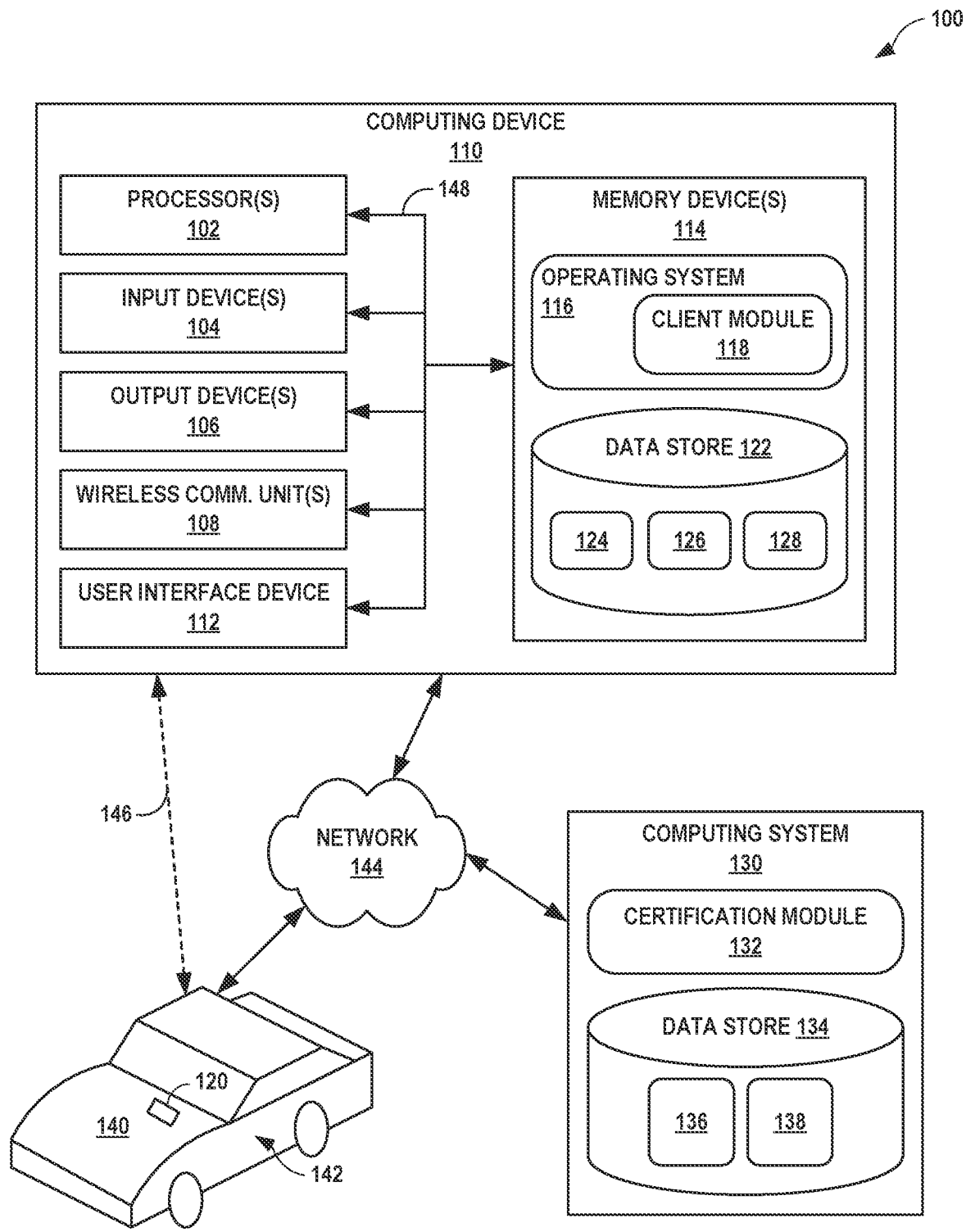
FIG. 1 is a conceptual diagram illustrating an example environment for certifying unbonded access to a vehicle via a digital key device, in accordance with one or more aspects of the present disclosure.

FIG. 1 is a conceptual diagram illustrating an example environment for certifying unbonded access to a vehicle via a digital key device, in accordance with one or more aspects of the present disclosure. As can be seen, environment 100 may include a computing device 110, a computing system 130, and a vehicle 140. As described herein, computing system 130 may constitute a central authority for certifying unbonded access to vehicle 140, and computing device 110 may be referred to as a digital key device 110 in that computing device/digital key device 110 may be used to obtain access to vehicle 140 and vehicle functions.

Computing device 110 may be an example of a mobile phone, a tablet computer, a laptop computer, a wearable device, a gaming system, a media player, an e-book reader, or any other type of computing device that may operate as a digital key. FIG. 1 illustrates a particular example of computing device 110, and many other examples of computing device 110 may be used in other instances and may include a subset of the components included in example computing device 110 or may include additional components not shown in FIG. 1.

Computing device 110 includes user interface device 112, one or more processors 102, one or more input devices 104, one or more wireless communication units 108, one or more output devices 106, and one or more memory devices 114. One or more memory devices 114 of computing device 110 may include operating system 116, client module 118, and data store 122. Data store 122 may store various data, such as in a structured or unstructured format. For example, data store 122 may be a database or a file folder for storing various data. For instance, data store 122 may store one or more service identifiers 124, one or more signed tokens 126, one or more device identifiers 128, other data, or various subsets thereof.

Communication channels 148 may interconnect each of the components 102, 104, 106, 108, and 112 for inter-component communications (physically, communicatively, and/or operatively). In some examples, communication channels 148 may include a system bus, a network connection, an inter-process communication data structure, or any other method for communicating data.

One or more input devices 104 of computing device 110 may receive input. Examples of input are tactile, audio, and video input. Input devices 104 of computing device 110, in one example, includes a presence-sensitive display, touch-sensitive screen, mouse, keyboard, voice responsive system, video camera, microphone or any other type of device for detecting input from a human or machine.

One or more output devices 106 of computing device 110 may generate output. Examples of output are tactile, audio, and video output. Output devices 106 of computing device 110, in one example, includes a presence-sensitive display, sound card, video graphics adapter card, speaker, liquid crystal display (LCD), organic light-emitting diode (OLED) display, a light field display, haptic motors, linear actuating devices, or any other type of device for generating output to a human or machine.

One or more wireless communication units 108 of computing device 110 may communicate with external devices by transmitting and/or receiving communication signals, such as via one or more wireless networks or wireless connections. Examples of one or more wireless communication units 108 include a network interface card, an optical transceiver, a radio frequency transceiver, a global positioning system (GPS) receiver, or any other type of device that can wirelessly send and/or receive information. Other examples of one or more wireless communication units 108 may include short wave radios, cellular data radios, wireless network radios, as well as universal serial bus (USB) controllers. Though described with respect to wireless communication units, computing device 110 may also or alternatively include one or more wired communication units, such as network interface cards (e.g., Ethernet cards), optical transceivers, or any other type of device that can send and/or receive information over a wired connection.

User interface device 112 of computing device 110 may be hardware that functions as an input and/or output device for computing device 110. For example, user interface device 112 may include a display component, which may be a screen at which information is displayed by user interface device 112 and a presence-sensitive input device that may detect an object at and/or near the display component.

One or more processors 102 may implement functionality and/or execute instructions within computing device 110. For example, one or more processors 102 on computing device 110 may receive and execute instructions stored by one or more memory devices 114 that execute the functionality of operating system 116 and client module 118. The instructions executed by one or more processors 102 may cause computing device 110 to store information within one or more memory devices 114 during program execution. Examples of one or more processors 102 include application processors, display controllers, sensor hubs, and any other hardware configured to function as a processing unit. One or more processors 102 may execute instructions of operating system 116 and client module 118 to perform actions or functions. That is, operating system 116 and client module 118 may be operable by one or more processors 116 to perform various actions or functions of computing device 110.

One or more memory devices 114 within computing device 110 may store information for processing during operation of computing device 110. That is, computing device 110 may store data accessed by operating system 116 and client module 118 during execution at computing device 110, including service identifiers 124, stored tokens 126, device identifiers 128, other data, or various subsets thereof. In some examples, memory device 114 is a temporary memory, meaning that a primary purpose of memory device 114 is not long-term storage. One or more memory devices 114 on computing device 110 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

One or more memory devices 114, in some examples, also include one or more computer-readable storage media. One or more memory devices 114 may be configured to store larger amounts of information than volatile memory. One or more memory devices 114 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. One or more memory devices 114 may store program instructions and/or information (e.g., data) associated with operating system 116 and client module 118.

Client module 118, may execute at one or more processors 102 to perform functions related to certifying unbonded access. In some examples, client module 118 may operate in conjunction with computing system 130. For example, client module 118 may be used to create a user or vehicle account at computing system 130 for a user of computing device 110 or vehicle 140, respectively. Account information, such as authentication information (e.g., username, password, multi-factor authentication tokens), user information (e.g., name and address information), payment information (e.g., credit card or bank account information), user preferences (e.g., account settings), subscription/membership information, or various subset thereof, may be received by client module 118. For example, client module 118 may receive account information from a user via user interface device 112, input device 104, or both such as to sign up the user. Client module 118 may transmit the account information to computing system 130 via wireless communication unit 108 and network 144. Computing system 130 may process and/or store the account information to create an account. The account may be required before client module 118 may transmit or receive service identifiers 124, signed tokens 126, or both, such as to or from computing system 130.

Client module 118 may be used to create one or more itineraries, such as for a trip, journey, route, or task. For example, client module 118 may receive itinerary information including a start time and/or end time (e.g., a start and/or end date), a starting location and ending location (e.g., starting/ending coordinates or addresses), a route (e.g., driving directions), a task (e.g., parcel/food delivery), or other calendaring or scheduling information. For instance, client module 118 may receive itinerary information indicating a route and start time from the user via user interface device 112, input device 104, or both. Client module 118 may transmit the itinerary information to computing system 130 and computing system 130 may process and/or store the itinerary information to create an itinerary for the user. Client module 118 may receive confirmation of the itinerary from computing system 130 that confirms that the itinerary has been created.

In some examples, client module 118 may transmit a start notification identifying the itinerary to computing system 130, such as via wireless communication unit 108. The notification may indicate that client module 118 is ready to start the itinerary. As will be described further below, responsive to receipt of the start notification, computing system 130 may generate and transmit one or more service identifiers 124 and one or more signed tokens 126 used to certify unbonded access to a vehicle 140.

The start notification may signify to computing system 130 that client module 118 is ready to begin the itinerary (e.g., start a trip, journey, or route). The start notification may be transmitted for various reasons. For example, client module 118 may transmit the start notification at the start time of the itinerary or a predefined period of time before the start time of the itinerary. In some examples, client module 118 may transmit the start notification based on location or proximity in some examples. For instance, client module 118 may transmit the start notification upon determining computing device 110 is within a predefined distance (e.g., 10 ft) of a starting location of the itinerary. In some examples, client module 118 may determine computing device 110 is within a predefined distance of the starting location using a GPS receiver and GPS signals, such as by determining that the GPS coordinates of computing device 110 are within the predefined distance of the GPS coordinates of the starting location.

In some examples, client module 118 may transmit the start notification to computing system 130 upon determining vehicle 140 and computing device 110 are within a predefined distance (e.g., 10 ft). For instance, client module 118 may determine computing device 110 and vehicle 140 are within a predefined distance using a GPS receiver and GPS signals, such as by determining that the GPS coordinates of computing device 110 and vehicle 140 are within the predefined distance. Client module 118 may determine computing device 110 and vehicle 140 are within a predefined distance without GPS, such as by computing device 110 receiving and/or measuring the strength of one or more signals from vehicle 140, or vice versa, such as via wireless communication unit 108.

Network 144 represents any public or private communications network, for instance, cellular, Wi-Fi, and/or other types of networks, for transmitting data between computing systems, servers, and computing devices. Network 144 may include one or more network hubs, network switches, network routers, or any other network equipment, that are operatively inter-coupled thereby providing for the exchange of information between computing system 130 and computing device 110. Computing device 110, vehicle 140, and computing system 130 may transmit and receive data across network 144 using any suitable communication techniques. For example, account information, itinerary information, service identifiers 124, and signed tokens 126 may be transmitted and received between computing system 130 and computing device 110 as well as computing system 130 and vehicle 140 via network 144. Each of computing device 110, vehicle 140, and computing system 130 may be operatively coupled to network 144 using respective network links, such as Ethernet, Wi-Fi, or any other types of wired and/or wireless network connections.

Vehicle 140 may be an example of a car, truck, boat, aircraft, train, bicycle, motorcycle, scooter, skateboard, or any other type of motorized or non-motorized vehicle. FIG. 1 illustrates a particular example of vehicle 140, and many other examples of vehicle 140 may be used in other instances and may include a subset of the components included in example vehicle 140 or may include additional components not shown in FIG. 1. Vehicle 140 may include one or more device implements 142 or components that provide various functions or features of vehicle 140. Example device implements 142 may include devices such as actuators, motors, and electronic systems. In some examples, device implements 142 may include door locks, ignition systems, steering/control systems, transmission systems (e.g., automatic or manual transmissions), infotainment systems, door/window actuation systems (e.g., door/window motors). Unbonded access to vehicle 140 may include unbonded access to device implements 142 of vehicle 140 in some examples. For example, unbonded access to vehicle 140 may permit a user to unlock and enter vehicle 140, drive or operate a vehicle 140, and/or use other functions of vehicle 140 implemented via device implements 142.

As shown in FIG. 1, vehicle 140 may include computing device 120. In some examples, computing device 120 may be a computer or computing device installed in vehicle 140, such as an electronic control unit (ECU), navigation system, or infotainment system. Computing device 110 and computing device 120 of vehicle 140 may perform similar operations when certifying unbonded access to vehicle 140. As such, in some examples, computing device 120 may be an example computing device 110, except that, computing device 120 may not be considered a digital key device at least for the reason that computing device 120 is integral to (e.g., a component of) vehicle 140.

In accordance with the techniques disclosed herein, computing device 120 and computing device 110 may operate in conjunction with computing system 130 to certify unbonded access to vehicle 140. For example, computing system 130, with computing device 120 and computing device 110, may certify unbonded access to vehicle 140, without requiring computing device 120/vehicle 140 and computing device 110 to be previously paired or linked.

Figure 2:
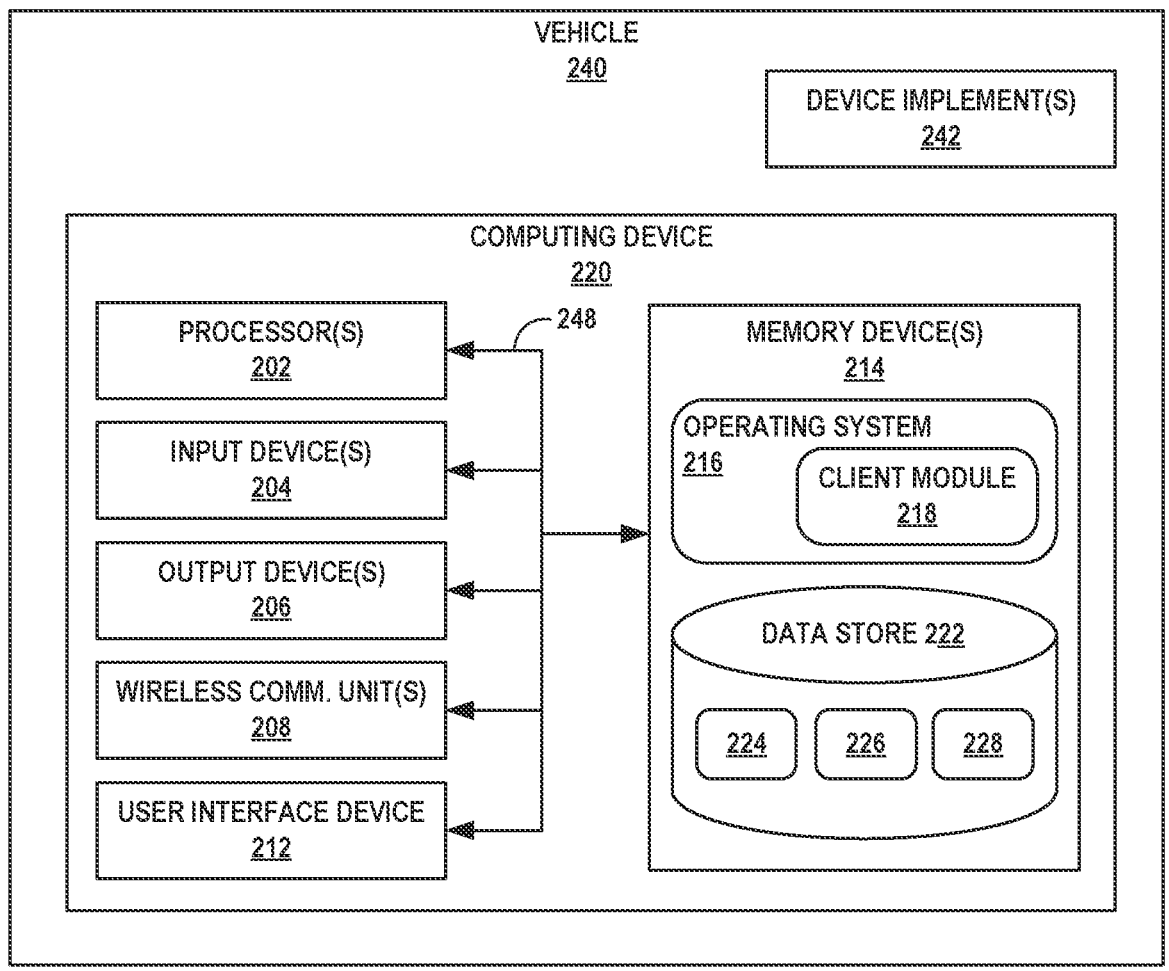
FIG. 2 is a block diagram illustrating an example vehicle, in accordance with one or more aspects of the present disclosure.

FIG. 2 is a block diagram illustrating an example vehicle, in accordance with one or more aspects of the present disclosure. As can be seen, vehicle 240 may include one or more computing devices 220 and one or more device implements 242. In FIG. 2, vehicle 240, device implements 242, and computing device 220 may respectively be examples of vehicle 140, device implements 142, and computing device 120 of FIG. 1. FIG. 2 illustrates a particular example of computing device 220, and many other examples of computing device 220 may be used in other instances and may include a subset of the components included in example computing device 220 or may include additional components not shown in FIG. 2.

Similar to computing device 110 of FIG. 1, computing device 210 includes user interface device 212, one or more processors 202, one or more input devices 204, one or more wireless communication units 208, one or more output devices 206, and one or more memory devices 214. One or more memory devices 214 of computing device 210 may include operating system 216, client module 218, and data store 222. Data store 222 may store various data, such as in a structured or unstructured format. For example, data store 222 may be a database or a file folder. In some examples, data store 122 may store one or more service identifiers 224, one or more device identifiers 228, or both.

As described above, computing device 110 and computing device 220 may perform similar operations when certifying unbonded access to vehicle 240. As such, processor 202, input device 204, output device 206, wireless communication unit 108, user interface device 212, memory device 214, operating system 216, client module 218, and data store 222, communication channels 248 of computing device 220 FIG. 2 may respectively be examples of processor 102, input device 104, output device 106, wireless communication unit 108, user interface device 112, memory device 114, operating system 116, client module 118, and data store 122, communication channels 148 of computing device 110 FIG. 1. Similarly, service identifier 224, signed token 226, and device identifier 228 of FIG. 2 may respectively be examples of service identifier 124, signed token 126, and device identifier 128 of FIG. 1.

Referring to FIGS. 1-2, computing system 130 may be any suitable remote computing system, such as one or more desktop computers, laptop computers, mainframes, servers, cloud computing systems, virtual machines, etc. capable of sending and receiving information via network 144. In some examples, computing system 130 may represent a cloud computing system that provides one or more services via network 144. That is, in some examples, computing system 130 may be a distributed computing system. One or more computing devices, such as computing device 110, may access the services provided by the cloud by communicating with computing system 130.

In some examples, computing system 130 includes one or more processors, one or more wireless communication devices, and one or more memory devices. A memory device of computing system 130 may include an operating system, which may provide an execution environment for a certification module 132 that, when executed by one or more processors, certifies unbonded access to vehicle 140 as described herein. A memory device of computing system 130 may include a data store 134 that stores various data, such as in a structured or unstructured format. For example, data store 134 may be a database or a file folder. In some examples, data store 122 may store account information 136, itinerary information 138, or other data.

Computing system 130, computing device 110, and computing device 120 of vehicle 140 may operate in conjunction to certify unbonded access to vehicle 140. For example, as described above, computing system 130 may receive a start notification from computing device 110. In response, computing system 130 may generate service identifier 124 and signed token 126 and transmit service identifier 124 and signed token 126 to computing device 110, such as via network 144. Similarly, computing system 130 may receive a start notification from computing device 120 of vehicle 140. In response, computing system 130 may generate service identifier 224 and signed token 226 and transmit service identifier 224 and signed token 226 to computing device 120, such as via network 144.

Service identifier 124, 224 may be various identifiers in some examples. For instance, computing system 130 may generate service identifier 124, 224 by generating an alphanumeric character string or binary data with a random number generator or by execution of a heuristic for generating identifiers (e.g., a universally unique identifier generator). In some examples, computing system 130 may encrypt service identifier 124, 224. Signed token 126, 226 may be a cryptographic or otherwise encrypted or encoded token. For example, signed token 126, 226 may be cryptographically signed such that computing system 130 may verify that computing system 130 generated signed token 126, 226. Computing system 130 may sign or encrypt signed token 126, 226 such as through various encryption methods, including public key infrastructure (PKI) encryption methods. Computing system 130 may store a copy of service identifiers 124, 224, signed tokens 126, 226, or both such as in data store 134.

As shown in the example of FIG. 1, computing device 110 may receive, from computing system 130, service identifier 124 and signed token 126 and store service identifier 124 and signed token 126 on memory device 114. Computing device 120 may receive, from computing system 130, service identifier 224 and signed token 226 and store service identifier 224 and signed token 226 on memory device 214. Computing devices 110, 120 may advertise (e.g., transmit) their respective service identifiers 124, 224. Computing devices 110, 120 may transmit service identifiers 124, 224 wireless communication units 108, 208 using various wireless protocols. For example, computing devices 110, 120 may transmit service identifiers 124, 224 as a generic attribute profile (GATT) characteristic or identifier, such as via a wireless communication unit 108, 208 comprising a BLUETOOTH low energy (BLE) radio.

Computing devices 110, 120 may utilize service identifiers 124, 224 to establish a connection or communication link 146 therebetween. For example, computing device 120 may advertise (e.g., transmit) service identifier 124 and computing device 110 may scan for (e.g., receive) service identifiers. Computing device 110 may compare service identifier 124 to service identifier 224 and determine whether service identifier 124 corresponds to or matches service identifier 224. If service identifier 124 and service identifier 224 correspond or match, computing device 110 may establish a communication link 146 with computing device 120, such as shown in FIG. 1. The communication link 148 may be wireless and may be established by computing devices 110, 120 via respective wireless communication units 108, 208. In some examples, advertising and scanning may be reversed. For instance, computing device 110 may advertise service identifier 224 and computing device 120 of vehicle 140 may scan for service identifiers. In such an example, computing device 120 may compare service identifier 224 with service identifier 124 and establish a communication link 146 when service identifier 224 and service identifier 124 match.

Communication link 146 may be various communication links. In some examples, computing devices 110, 120 may establish a secure (e.g., encrypted) or insecure (e.g., unencrypted) communication link 146. For example, computing device 110, 120 may establish an insecure logical link control and adaptation protocol (L2CAP) connection via respective wireless communication units 108, 208. Though described as a wireless communication link 146, communication link 146 may be wired in some examples. For example, vehicle 140 and computing device 110 may be in electrical/optical communication via one or more electrical/optical conductors or connectors when certification of unbonded access occurs.

Computing devices 110, 120 may exchange or share signed tokens 126, 226 with one another. For example, computing device 110 may transmit signed token 126 to computing device 120 and computing device 120 may transmit signed token 226 to computing device 110. Computing device 110, 120 may verify signed tokens 126, 226 received from the other computing device 110, 120. For example, computing device 110 may verify signed token 226 and computing device 120 may verify signed token 126.

Computing devices 110, 120 may verify signed tokens 126, 226 by transmitting signed tokens 126, 226 to computing system 130 for verification. For example, computing device 110 may transmit signed token 226 (received from computing device 120) to computing system 130 verification and computing device 120 may transmit signed token 126 (received from computing device 110) to computing system 130 for verification. Computing system 130 may verify signed token 126, 226 in various ways. In some examples, computing system 130 may verify signed token 126, 226 by verifying a signature of signed token 126, 226. If necessary, computing system 130 may decrypt signed token 126, 226, such as with a private key of computing system 130 where signed token 126, 226 was encrypted with a public key of computing system 130.

Computing system 130 may indicate whether signed token 126, 226 was verified. For example, responsive to receiving signed token 226 from computing device 110, computing system 130 may transmit a verification notification to computing device 110 indicating whether or not signed token 226 was verified. Similarly, responsive to receiving signed token 126 from computing device 120, computing system 130 may transmit a verification notification to computing device 120 indicating whether or not signed token 126 was verified.

Computing device 110, 120 may perform one or more functions or refrain from the same based on whether or not their respective signed token 126, 226 was verified by computing system 130. For example, responsive to receiving a verification notification that signed token 126 was verified, computing device 120 may authorize use of a function of vehicle 140, such as be authorizing use of device implement 142 of vehicle 140. For instance, computing device 120 may unlock a door of vehicle 140 or permit the ignition of vehicle 140 to be started. With respect to computing device 110, responsive to receiving a verification notification that signed token 226 was verified, computing device 110 may present a message indicating that vehicle 140 is the vehicle 140 requested or referenced by the itinerary created by the user of computing device 110. For example, computing device 110 may present a message, such as via user interface device 112 or output device 106, indicating the vehicle 140 was verified and is safe to enter.

Figure 3:
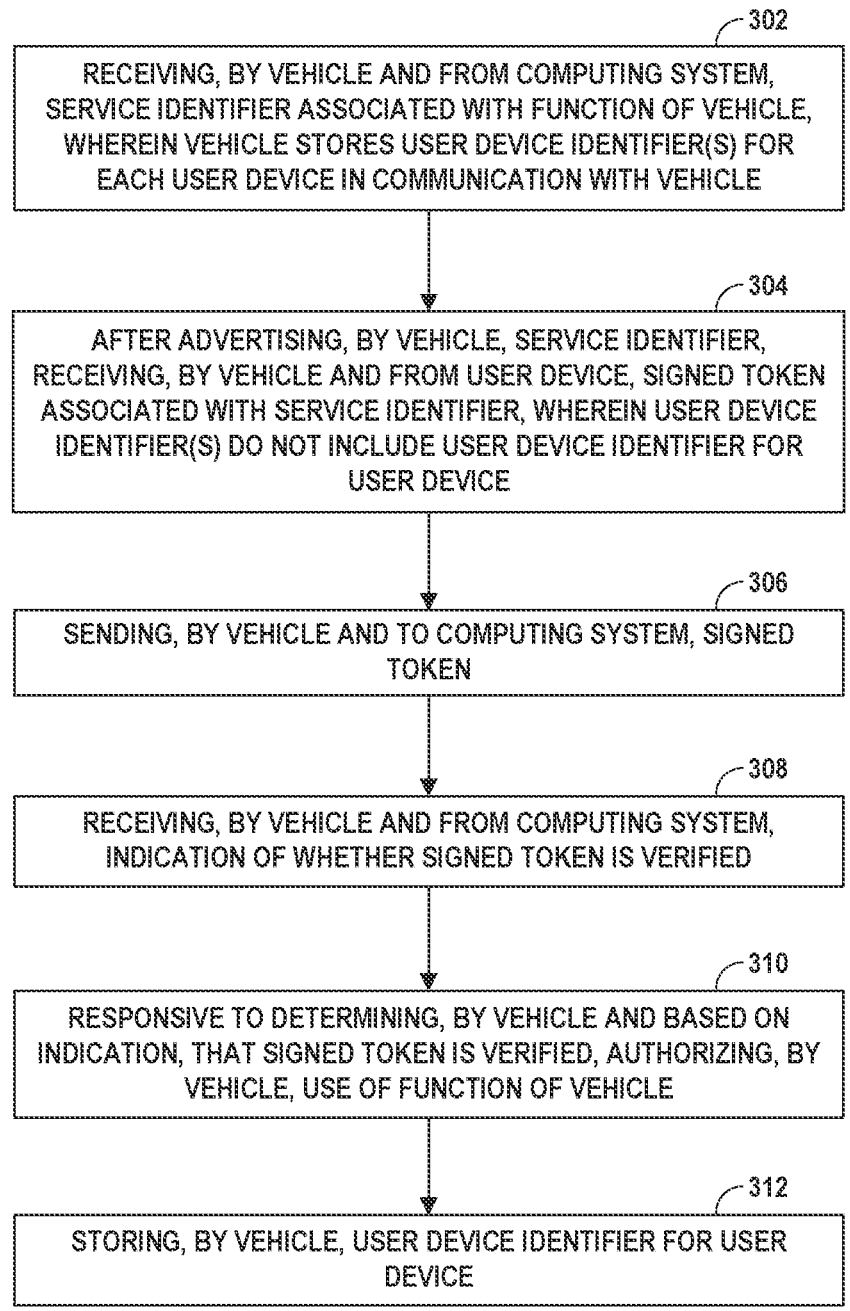
FIG. 3 is a flowchart of an example process for certifying unbonded access to a vehicle via a digital key device, in accordance with one or more aspects of the present disclosure.

FIG. 3 is a flowchart of an example process for certifying unbonded access to a vehicle via a digital key device, in accordance with one or more aspects of the present disclosure. FIG. 3 is described in the context of FIGS. 1-2.

In some examples, vehicle 240 may store one or more device identifiers 228 for each digital key device 110 in communication with or that has established communication with vehicle 240. Vehicle 240 may receive from computing system 130, service identifier 224 associated with a function of vehicle 240 (302). For example, computing system 130 may store service identifier 224 in data store 134 along with an itinerary indicating a function of vehicle 240 to be used during itinerary (e.g., unlock door or drive vehicle). Some example functions of vehicle 240 include unlocking one or more doors, starting the vehicle, selecting a drive mode (e.g., gear), and driving the vehicle. Vehicle 240 may advertise service identifier 224, such as via wireless communication unit 208.

After advertising service identifier 224, vehicle 240 may receive signed token 126 associated with service identifier 224 (304). For example, digital key device 110 may store service identifier 224 and scan for service identifiers, such as service identifier 224. Upon determining a service identifier, such as advertised service identifier 224 corresponds to or matches service identifier 124, digital key device 110 may transmit signed token 126 to vehicle 240. Vehicle 240 may then receive signed token 126. In this example, device identifiers 228 currently stored by vehicle 240 may not include device identifier 128 for digital key device 110, indicating that vehicle 240 and digital key device 110 have not previously established communication or communicated.

Vehicle 240 may send signed token 126 to computing system 130 (306). Vehicle 240 may receive an indication of whether signed token 126 is verified from computing system 130 (308). Responsive to determining, by vehicle that signed token 126 is verified based on the indication from computing system 130, vehicle 240 may authorize use of the function of vehicle 240 (310). Vehicle 240 may store device identifier 128 for digital key device 110 (312), such as device identifier 228 of memory device 214. When vehicle 240 determines, based on the indication, that signed token 126 is not verified, vehicle 240 may refrain from authorizing use of the function of vehicle 240. In some examples, vehicle 240 may send an indication that vehicle 240 is disabled (e.g., damaged, out of fuel) to computing system 130. Computing system 130 may respond by refraining from verifying signed token 126 (e.g., transmitting an indication that signed token 126 is not verified) when vehicle 240 is disabled.

Digital key device 110 may verify signed token 226 of vehicle 240 in some examples. For instance, digital key device 110 may receive signed token 226 from vehicle 240 and send signed token 226 to computing system 130 for verification. Digital key device 110 may receive, from computing system 130, an indication signed token 226 was verified by computing system 130. In response to receiving the indication of the verification of signed token 226, digital key device 110 may perform a predefined function. For example, digital key device 110 may present a notification that vehicle 240 is verified to convey to the user of digital key device 110 that the vehicle 240 is the requested vehicle. Vehicle 240 may receive signed token 226 from computing system 130 and digital key device 110 may receive signed token 126 from computing system 130 to allow vehicle 240 and computing device 110 to exchange signed tokens 126, 226 for verification as described above.

In some examples, vehicle 240 may receive, from computing system 130, an indication of an itinerary (e.g., itinerary information) including an occurring time period (e.g., a start and end time) within which the itinerary is to occur. When vehicle 240 determines a current time is outside the occurring time period, vehicle 240 may refrain from authorizing use of the function of vehicle 240.

Vehicle 240 may establish a communication link 146 with digital key device 110 for communication purposes in some examples. Vehicle 240 may receive one or more commands from digital key device 110 via the communication link 146. The commands may control operation of the function of vehicle 240. For example, the commands may control door locks, infotainment, or navigation systems of vehicle 240. Vehicle 240 may terminate communication link 146 based on one or more criteria received from computing system 130. For example, vehicle 240 may terminate communication at the end of an itinerary, such as at an ending time of the itinerary or when an ending location of the itinerary is reached.

Figure 4:
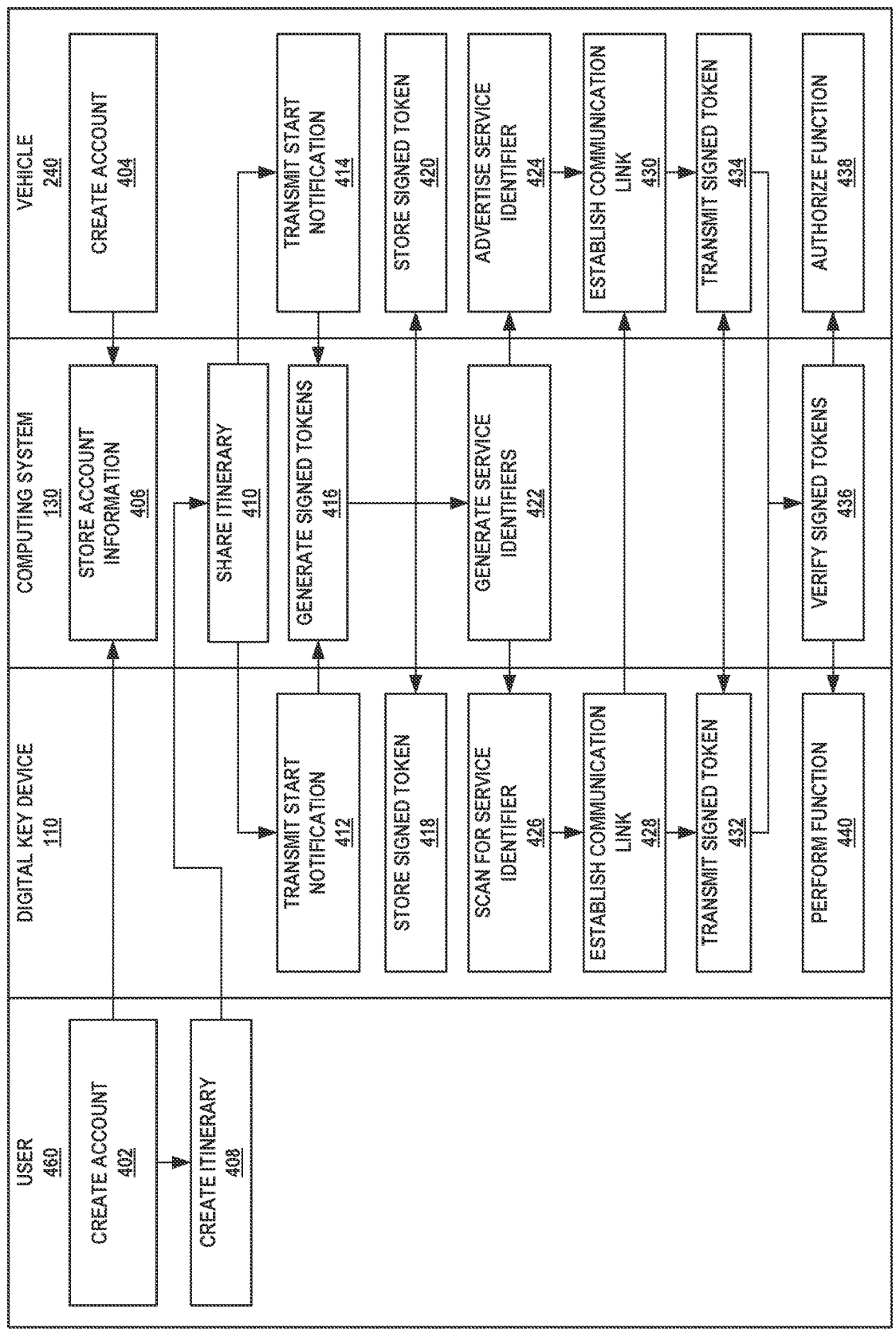
FIG. 4 is a conceptual diagram illustrating an example process for certifying unbonded access to a vehicle via a digital key device, in accordance with one or more aspects of the present disclosure.

FIG. 4 is a conceptual diagram illustrating an example process for certifying unbonded access to a vehicle via a digital key device, in accordance with one or more aspects of the present disclosure. FIG. 4 is described below in the context of FIGS. 1-2.

In some examples, a user 460 of digital key device 110 and vehicle 240 may have accounts at computing system 130. For instance, user 460, such as via digital key device 110 or other computing device, may create an account by sending the user's account information to computing system 130 (402) and vehicle 240 may create an account by an operator/user of vehicle 240 sending the vehicle's account information to computing system 130 (404). Computing system 130 may receive the account information of both user 460 and vehicle 240 and store such account information (406), such as in data store 134.

User 460, such as via digital key device 110 or other computing device, may create an itinerary at computing system 130 (408). Once the itinerary is created, computing system 130 may share (e.g., transmit) the itinerary with digital key device 110 and vehicle 240 (410). At a start of the itinerary, digital key device 110 and vehicle 240 may respectively transmit a start notification to computing system 130 (412, 414). For example, digital key device 110 and vehicle 240 may transmit a start notification at a starting time of the itinerary or when digital key device 110 and vehicle 240 are within a predetermined distance of one another.

In response, computing system 130 may generate signed tokens 126, 226 (416) and send signed tokens 126, 226 to vehicle 240 and digital key device 110. For example, computing system 130 may send signed token 226 to vehicle 240 and vehicle 240 may receive signed token 226. Computing system 130 may send signed token 126 to digital key device 110 and digital key device 110 may receive signed token 126. Digital key device 110 may store signed token 126 (418) and vehicle 240 may store signed token 226 (420).

Computing system 130 may generate service identifiers 124, 224 (422) and send service identifiers 124, 224 to digital key device 110 and vehicle 240. In some examples, computing system 130 may generate service identifiers 124, 224 in response to receiving the start notification. Vehicle 240 may advertise service identifier 224 (424) and digital key device 110 may scan for service identifier 224 (426). Upon detecting (e.g., receiving) service identifier 224, digital key device 110 may compare service identifier 224 to service identifier 124 and determine if service identifiers 124, 224 correspond to or match one another.

Responsive to determining a correspondence or match between service identifiers 124, 224, digital key device 110 and vehicle 240 may establish communication link 146 between digital key device 110 and vehicle 240 (428, 430). Digital key device 110 and vehicle 240 may utilize communication link 146 to exchange signed tokens 126, 226. For example, digital key device 110 may transmit signed token 126 to vehicle 240 (432) and vehicle 240 may transmit signed token 226 to digital key device 110 (434).

Digital key device 110 and vehicle 240 may subsequently verify exchanged signed tokens 126, 226. For example, digital key device 110 may transmit signed token 226 received from vehicle 240 to computing system 130 and vehicle 240 may transmit signed token 126 received from digital key device 110 to computing system 130. Computing system 130 may verify signed tokens 126, 226 (436). For example, computing system 130 may verify signed token 126 received from vehicle 240 and signed token 226 received from digital key device 110.

Computing system 130 may transmit an indication of whether signed token 126, 226 is verified or not verified. For example, computing system 130 may transmit an indication of whether signed token 126 is verified or not verified to vehicle 240 and transmit an indication of whether signed token 226 is verified or not verified to digital key device 110. When vehicle 240 receives an indication that signed token 126 is verified by computing system 130, vehicle 240 may authorize use of a function of vehicle 240 (438). For example, vehicle 240 may unlock or permit an ignition system to be started. When digital key device 110 receives an indication that signed token 226 is verified by computing system 130, digital key device 110 may perform a predefined function (440). For example, digital key device 110 may present a message, such as via user interface device 112, confirming that vehicle 240 is the requested vehicle 240.

Though described with respect to vehicles, the techniques disclosed herein may be used with various devices. For example, rather than a vehicle, unbonded access may be certified for mailboxes, delivery lockers, and other devices. For example, a delivery locker may include an example of computing device 120 and operate in conjunction with computing system 130 and digital key device 110 as described herein to allow the delivery locker to authorize access to the contents of delivery lock (e.g., unlock delivery locker via certified unbonded access).

Example 1: A method includes receiving, by a vehicle and from a computing system, a service identifier associated with a function of the vehicle, wherein the vehicle stores one or more device identifiers for each digital key device in communication with the vehicle; after advertising, by the vehicle, the service identifier, receiving, by the vehicle and from a digital key device, a signed token associated with the service identifier, wherein the one or more device identifiers do not include a device identifier for the digital key device; sending, by the vehicle and to the computing system, the signed token; receiving, by the vehicle and from the computing system, an indication of whether the signed token is verified; responsive to determining, by the vehicle and based on the indication, that the signed token is verified, authorizing, by the vehicle, use of the function of the vehicle; and storing, by the vehicle, the device identifier for the digital key device.

Example 2: The method of example 1, further includes responsive to determining, by the vehicle and based on the indication, that the signed token is not verified, refraining, by the vehicle, from authorizing use of the function of the vehicle.

Example 3: The method of example 1, further includes establishing, by the vehicle, a communication link with the digital key device; and receiving, by the vehicle, one or more commands from the digital key device via the communication link.

Example 4: The method of example 3, wherein the one or more commands control operation of the function of the vehicle.

Example 5: The method of example 3, further comprising terminating, by the vehicle, the communication link based on one or more criteria received from the computing system.

Example 6: The method of example 1, further comprising sending, by the vehicle, an indication that the vehicle is disabled, wherein the computing system refrains from verifying the signed token when the vehicle is disabled.

Example 7: The method of example 1, wherein the signed token is a first signed token, the method further includes receiving, by the digital key device, a second signed token from the vehicle; sending, by the digital key device, the second signed token to the computing system for verification; receiving, by the digital key device and from the computing system, an indication the second signed token was verified by the computing system; and responsive to receiving the indication of the verification of the second signed token, presenting, by the digital key device, a notification that the vehicle is verified.

Example 8: The method of example 7, further includes receiving, by the vehicle and from the computing system, the first signed token; and receiving, by the digital key device and from the computing system, the second signed token.

Example 9: The method of example 1, further comprising receiving, by the vehicle and from the computing system, an indication of an itinerary including an occurring time period within which the itinerary is to occur.

Example 10 The method of example 9, further includes determining, by the vehicle, a current time is outside the occurring time period; and responsive to determining the current time is outside the occurring time period, refraining, by the vehicle, from authorizing use of the function of the vehicle:

Example 11: The method of example 1, wherein the function is an action performed by the vehicle selected from the group consisting of unlocking one or more doors, starting the vehicle, and selecting a drive mode of the vehicle.

Example 12: A vehicle includes a memory that stores instructions; and one or more processors that execute the instructions to: receive, from a computing system, a service identifier associated with a function of the vehicle, wherein the vehicle stores one or more device identifiers for each digital key device in communication with the vehicle; after advertising the service identifier, receive, from a digital key device, a signed token associated with the service identifier, wherein the one or more device identifiers do not include a device identifier for the digital key device; send, to the computing system, the signed token; receive, from the computing system, an indication of whether the signed token is verified; responsive to determining, based on the indication, that the signed token is verified, authorize use of the function of the vehicle; and store the device identifier for the digital key device.

Example 13: The vehicle of example 12, wherein the one or more processors further execute the instructions to: responsive to determining, based on the indication, that the signed token is not verified, refrain from authorizing use of the function of the vehicle.

Example 14: The vehicle of example 12, wherein the one or more processors further execute the instructions to: establish a communication link with the digital key device; and receive one or more commands from the digital key device via the communication link.

Example 15: The vehicle of example 14, wherein the one or more commands control operation of the function of the vehicle.

Example 16: The vehicle of example 14, wherein the one or more processors further execute the instructions to terminate the communication link based on one or more criteria received from the computing system.

Example 17: The vehicle of example 12, wherein the one or more processors further execute the instructions to send an indication that the vehicle is disabled, wherein the computing system refrains from verifying the signed token when the vehicle is disabled.

Example 18: The vehicle of example 12, wherein the one or more processors further execute the instructions to receive, from the computing system, an indication of an itinerary including an occurring time period within which the itinerary is to occur.

Example 19: The vehicle of example 18, wherein the one or more processors further execute the instructions to: determine a current time is outside the occurring time period; and responsive to determining the current time is outside the occurring time period, refrain from authorizing use of the function of the vehicle.

Example 20: A non-transitory computer-readable storage medium including instructions, that when executed by one or more processors of a computing device, cause the one or more processors to: receive, from a computing system, a service identifier associated with a function of the vehicle, wherein the vehicle stores one or more device identifiers for each digital key device in communication with the vehicle; after advertising the service identifier, receive, from a digital key device, a signed token associated with the service identifier, wherein the one or more device identifiers do not include a device identifier for the digital key device; send, to the computing system, the signed token; receive, from the computing system, an indication of whether the signed token is verified; responsive to determining, based on the indication, that the signed token is verified, authorize use of the function of the vehicle; and store the device identifier for the digital key device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), EEPROM, compact disc read-only memory (CD-ROM) or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structures suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

Various embodiments have been described. These and other embodiments are within the scope of the following claims.

What is claimed is:

1. A method comprising:
    receiving, by a vehicle and from a computing system, a service identifier associated with a function of the vehicle, wherein the vehicle stores one or more device identifiers for each digital key device in communication with the vehicle;
    after advertising, by the vehicle, the service identifier, receiving, by the vehicle and from a digital key device, a signed token associated with the service identifier, wherein the one or more device identifiers do not include a device identifier for the digital key device;
    sending, by the vehicle and to the computing system, the signed token;
    receiving, by the vehicle and from the computing system, an indication of whether the signed token is verified;
    responsive to determining, by the vehicle and based on the indication, that the signed token is verified, authorizing, by the vehicle, use of the function of the vehicle; and
    storing, by the vehicle, the device identifier for the digital key device.

2. The method of claim 1, further comprising:
    responsive to determining, by the vehicle and based on the indication, that the signed token is not verified, refraining, by the vehicle, from authorizing use of the function of the vehicle.

3. The method of claim 1, further comprising:
    establishing, by the vehicle, a communication link with the digital key device; and
    receiving, by the vehicle, one or more commands from the digital key device via the communication link.

4. The method of claim 3, wherein the one or more commands control operation of the function of the vehicle.

5. The method of claim 3, further comprising terminating, by the vehicle, the communication link based on one or more criteria received from the computing system.

6. The method of claim 1, further comprising sending, by the vehicle, an indication that the vehicle is disabled, wherein the computing system refrains from verifying the signed token when the vehicle is disabled.

7. The method of claim 1, wherein the signed token is a first signed token, the method further comprising:
    receiving, by the digital key device, a second signed token from the vehicle;
    sending, by the digital key device, the second signed token to the computing system for verification;
    receiving, by the digital key device and from the computing system, an indication the second signed token was verified by the computing system; and
    responsive to receiving the indication of the verification of the second signed token, presenting, by the digital key device, a notification that the vehicle is verified.

8. The method of claim 7, further comprising:
    receiving, by the vehicle and from the computing system, the first signed token; and
    receiving, by the digital key device and from the computing system, the second signed token.

9. The method of claim 1, further comprising receiving, by the vehicle and from the computing system, an indication of an itinerary including an occurring time period within which the itinerary is to occur.

10. The method of claim 9, further comprising:
    determining, by the vehicle, a current time is outside the occurring time period; and
    responsive to determining the current time is outside the occurring time period, refraining, by the vehicle, from authorizing use of the function of the vehicle.

11. The method of claim 1, wherein the function is an action performed by the vehicle selected from the group consisting of unlocking one or more doors, starting the vehicle, and selecting a drive mode of the vehicle.

12. A vehicle comprising:
    a memory that stores instructions; and
    one or more processors that execute the instructions to:
        receive, from a computing system, a service identifier associated with a function of the vehicle, wherein the vehicle stores one or more device identifiers for each digital key device in communication with the vehicle;

after advertising the service identifier, receive, from a digital key device, a signed token associated with the service identifier, wherein the one or more device identifiers do not include a device identifier for the digital key device;

send, to the computing system, the signed token;

receive, from the computing system, an indication of whether the signed token is verified;

responsive to determining, based on the indication, that the signed token is verified, authorize use of the function of the vehicle; and store the device identifier for the digital key device.

13. The vehicle of claim 12, wherein the one or more processors further execute the instructions to:

responsive to determining, based on the indication, that the signed token is not verified, refrain from authorizing use of the function of the vehicle.

14. The vehicle of claim 12, wherein the one or more processors further execute the instructions to:

establish a communication link with the digital key device; and receive one or more commands from the digital key device via the communication link.

15. The vehicle of claim 14, wherein the one or more commands control operation of the function of the vehicle.

16. The vehicle of claim 14, wherein the one or more processors further execute the instructions to terminate the communication link based on one or more criteria received from the computing system.

17. The vehicle of claim 12, wherein the one or more processors further execute the instructions to send an indication that the vehicle is disabled, wherein the computing system refrains from verifying the signed token when the vehicle is disabled.

18. The vehicle of claim 12, wherein the one or more processors further execute the instructions to receive, from the computing system, an indication of an itinerary including an occurring time period within which the itinerary is to occur.

19. The vehicle of claim 18, wherein the one or more processors further execute the instructions to:

determine a current time is outside the occurring time period; and responsive to determining the current time is outside the occurring time period, refrain from authorizing use of the function of the vehicle.

20. A non-transitory computer-readable storage medium comprising instructions, that when executed by one or more processors of a computing system, cause the one or more processors to:

receive, from a computing system, a service identifier associated with a function of a vehicle, wherein the vehicle stores one or more device identifiers for each digital key device in communication with the vehicle;

after advertising the service identifier, receive, from a digital key device, a signed token associated with the service identifier, wherein the one or more device identifiers do not include a device identifier for the digital key device;

send, to the computing system, the signed token;

receive, from the computing system, an indication of whether the signed token is verified;

responsive to determining, based on the indication, that the signed token is verified, authorize use of the function of the vehicle; and store the device identifier for the digital key device.

* * * * *